United States Patent [19]

Scherbring

[11] 4,227,364

[45] Oct. 14, 1980

[54] SELF-COMPENSATING BRAKE SYSTEM FOR A MOWING MACHINE

[75] Inventor: David J. Scherbring, Edina, Minn.

[73] Assignee: The Toro Company, Minneapolis, Minn.

[21] Appl. No.: 875,785

[22] Filed: Feb. 7, 1978

[51] Int. Cl.³ ............................................ A01D 69/10
[52] U.S. Cl. ...................................... 56/10.8; 56/11.3; 74/478; 180/212; 188/190; 192/3 R
[58] Field of Search .............................. 56/10.8, 11.3; 188/72.9, 72.7, 217, 190; 180/25 R, 26 R, 26 A, 27; 74/478, 480 R; 192/3 R

[56] References Cited

U.S. PATENT DOCUMENTS

| 2,174,419 | 9/1939 | Holtzclaw | 74/478 |
| 2,443,331 | 6/1948 | Stewart | 74/478 |
| 3,220,189 | 11/1965 | Caramanna | 74/478 |
| 3,935,932 | 2/1976 | Moorhouse | 74/480 R |

*Primary Examiner*—Jay N. Eskovitz

*Attorney, Agent, or Firm*—Merchant, Gould, Smith, Edell, Welter & Schmidt

[57] ABSTRACT

A self-compensating brake system for a mowing machine of the type having a body movably supported by a plurality of rotatable drive wheels. The brake system includes a brake shaft which is rotatably journaled in the body and which is free-floating along a transverse axis. Each end of the brake shaft is connected to a mechanically actuated brake assembly on each of at least two opposed drive wheels by means of a brake rod. Each of the brake rods extend at an oblique angle relative to the transverse axis of the brake shaft. This orientation will move the brake shaft transversely in the body as the brake shaft is rotated by a brake pedal until the braking forces on each of the brake rods are equal, thereby assuring equal and even braking of the opposed drive wheels. The brake shaft also serves as the mounting structure for a traction pedal and for a steering transfer assembly.

7 Claims, 6 Drawing Figures

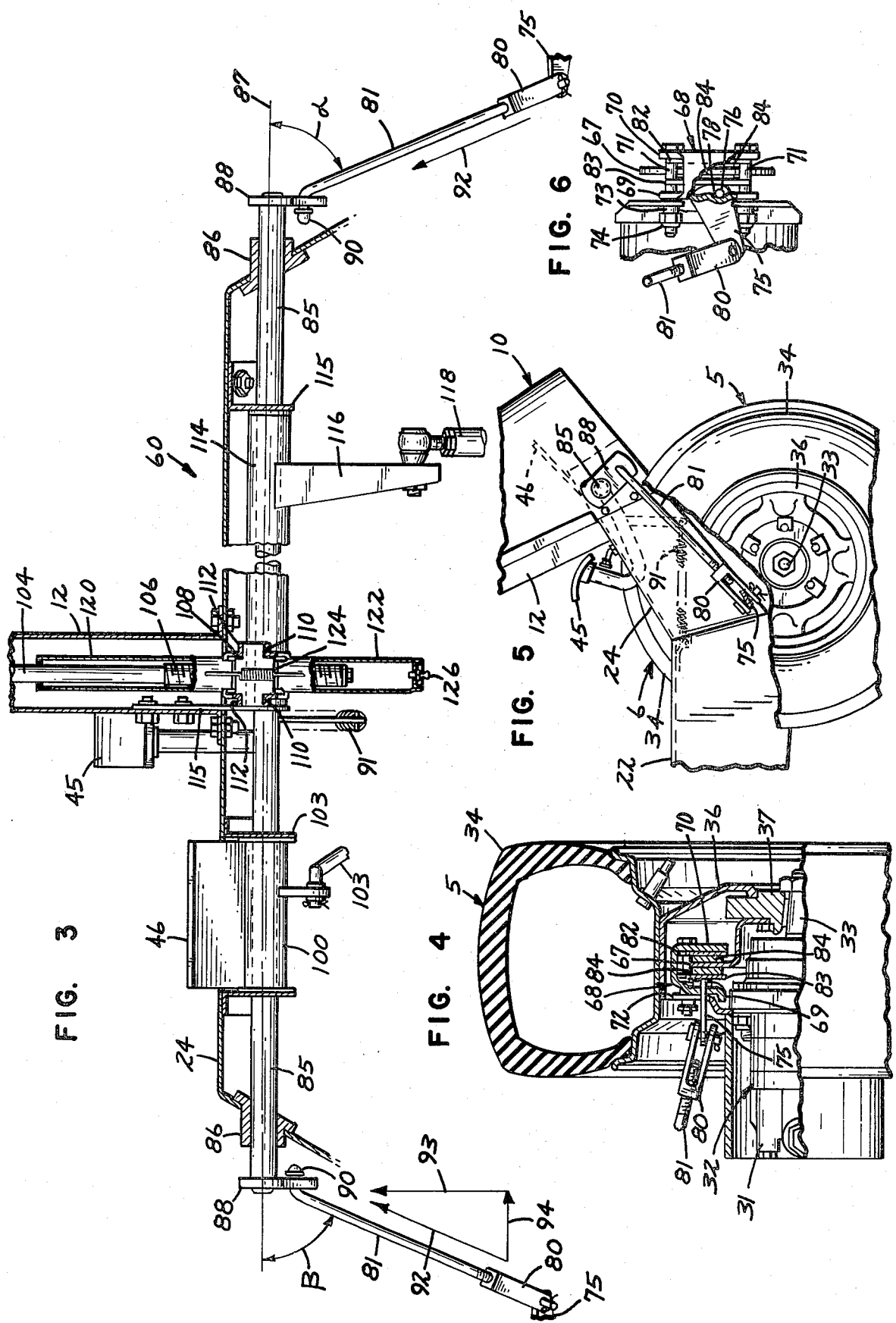

SELF-COMPENSATING BRAKE SYSTEM FOR A MOWING MACHINE

BACKGROUND OF THE INVENTION

1. Field of the Invention

This invention relates generally to an improved self-propelled grass mowing machine of the tri-plex type having a plurality of cutting units (e.g., three cutting units). Such a machine includes a powered body or traction unit which carries an operator who drives and controls the machine. More particularly, this invention relates to the brake system for the drive wheels of such a mowing machine including the structure and function of the brake shaft assembly.

2. Description of the Prior Art

Grass is a widely used ground for both private and public property. However, grass covered areas are sometimes very large which presents difficult problems in keeping the grass properly mowed. It is not uncommon for cemeteries, golf courses, parks, highway median strips, and the like to extend over many acres of land and be wholly or partially covered by grass. Such large areas usually are not capable of being efficiently mowed by "small scale" or household grass cutting equipment, such as a hand pushed walk-behind lawn mower. Furthermore, at least some of these large grass covered areas must be frequently mowed. For example, the grass on a golf course or cemetery must be mowed as often as once a week or more, especially during the height of the grass growing season. This further dictates against the use of small scale lawn mowing equipment. If such equipment were used to cut such large areas, it would require a large number of lawn mowing machines and a relatively large labor force to keep the grass adequately mowed. This would make the cutting of these grassy areas extremely expensive.

Various self-propelled "large scale" mowing machines have been designed to more efficiently cut large areas of land covered by grass. One general type of such a mowing machine is that known in the industry as a tri-plex machine. The tri-plex machine is a self-propelled mowing machine of the rider type (i.e., one which carries an operator) having an internal combustion engine as the basic power source. The machine comprises a frame or body member which is movably supported by a plurality of drive wheels. Three drive wheels arranged in a triangular relationship are sometimes used. In addition, the body of the tri-plex mowing machine usually supports three cutting units which are vertically movable into and out of engagement with the ground. Each of the cutting units comprises a rotatable reel type blade which sweeps the grass against a fixed bed knife to cut the grass. The drive for the cutting units and the drive wheels is usually taken off the internal combustion engine by generally conventional power transmission systems (e.g., mechanical belt drives and the like).

One feature of many tri-plex mowing machines is the use of mechanically operated brake systems for braking the drive wheels of the machine. In such brake systems, an actuating lever is connected to each of the brakes of opposed drive wheels. Each of these levers are connected in turn to opposed brake rods carried on either end of a brake shaft. When the brake shaft is rotated by the operator through manual actuation of a brake pedal, the brake rods pull on each of the actuating levers to actuate the drive wheel brakes in an amount which is proportional to the force applied to the actuating levers. When the force applied to each of the levers is not equal, unequal braking occurs on the opposed drive wheels of the machine. This causes the mowing machine to veer to one side or the other which disrupts the grass mowing pattern.

It has previously been necessary for the operator to adjust the brake rods relative to the actuating levers (e.g., by threading the brake rod into or out of a yoke which connects the brake rod to the actuating lever) to achieve equal braking action on each of the opposed drive wheels. The adjustment process is often one of trial and error. In other words, a large number of adjustment operations may be required to find the proper position of the brake rods which cause the drive wheel brakes to lock equally upon depression of the brake pedal. In addition, operation of the mowing machine over rough or uneven terrain may jostle the brake rods out of their proper positions. This requires that the machine be stopped and the brake rods be readjusted. The need for such continual adjustment of the brake rods, especially by a trial and error method, is both time-consuming and frustrating to the machine operator.

Tri-plex mowing machines also often utilize separate support rods or shafts for many of the controls which are actuated by the operator. More particularly, these machines often include a gas or traction pedal which regulates the ground speed of the machine and a steering assembly which transfers a steering force from a manually actuable steering wheel to one or more of the drive wheels. The traction pedal, the steering assembly and other similar controls have customarily been individually mounted on separate support rods or shafts. These shafts are separate from the brake shaft. Use of such separate shafts increases the manufacturing costs of the machine since a plurality of shafts are required along with corresponding support structures which rotatably mount the shafts in the machine, such as bushings, etc. In addition, the body of the mowing machine must usually be enlarged to accomodate these shafts since the shafts must be appropriately spaced from one another to allow free rotation thereof.

SUMMARY OF THE INVENTION

It is an aspect of this invention to provide a self-propelled grass mowing machine having a brake shaft assembly which mounts a steering transfer assembly and a traction pedal in addition to the components of the brake system. In addition, it is an apect of this invention to incorporate into a self-propelled grass mowing machine a self-compensating brake system which automatically corrects unequal braking on two opposed traction wheels without any substantial manual adjustment.

This invention comprises a self-propelled grass mowing machine having a self-compensating brake system. The mowing machine comprises a body supported by three traction or drive wheels arranged in a generally triangular relationship. Two of the drive wheels are opposed to one another and have mechanically activated disc brakes associated therewith for braking the mowing machine. A brake shaft is rotatably journaled in the body of the machine and is free-floating relative to the body along a transverse axis. Each end of the brake shaft is operatively connected to one of the brakes by a brake rod. The brake rod extends at an oblique angle relative to the transverse axis of the brake shaft.

Thus, as the operator of the machine activates the brake pedal to rotate the brake shaft, the brake rods will also be rotated causing a force to be applied along the brake rods to actuate the disc brake assemblies. Because of the orientation of the brake rods, the force along the brake rods will have at least one component along the axis of the brake shaft. These force components from the opposed brake rods will seek to balance against one another. This causes the brake shaft to slide relative to the body along its transverse axis until the braking forces on each of the brake rods, and hence on the disc brake assemblies, are equal. In addition, a traction pedal and a steering transfer assembly of the mowing machine are rotatably journaled about the brake shaft.

BRIEF DESCRIPTION OF THE DRAWINGS

The present invention will be described hereafter in the Detailed Description, when taken in conjunction with the following figures, in which like reference numerals will refer to like elements throughout.

FIG. 3 is a front elevational view, partly in cross-section, of the self-compensating brake system of the present invention shown embodied in the grass mowing machine of FIG. 1;

FIg. 4 is a partial cross-sectional, elevational view of a front drive wheel of the grass mowing machine shown in FIg. 1, illustrating the connection between a brake rod and the disc brake assembly of the drive wheel, and with the view of FIG.4 being rotated 45° about the center of the drive wheel;

FIG. 5 is a side-elevational view of a front drive wheel of the grass mowing machine shown in FIG. 1 and of the elongated brake shaft assembly of the present invention; and FIg. 6 is a partial top plan view of the disc brake assembly shown in FIG. 4 associated with one of the front drive wheels.

DETAILED DESCRIPTON

Figure 1:
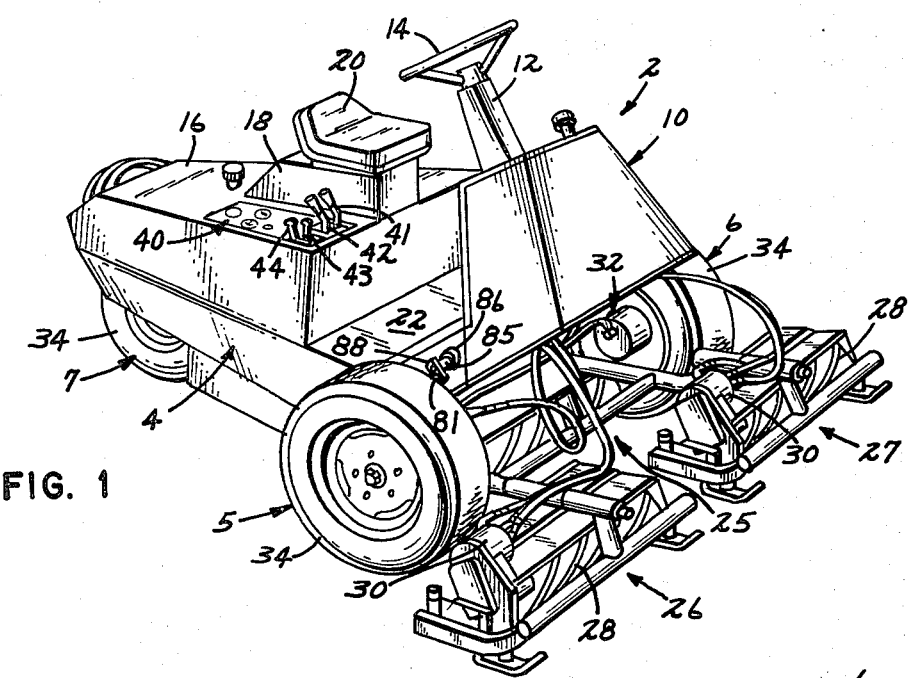
FIG. 1 is a perspective view of a self-propelled grass mowing machine according to the present invention.

Referring first to FIG. 1, an improved self-propelled, rider type mowing machine according to this invention is generally indicated as 2. Mowing machine 2 is particularly suited for cutting or mowing grass and other similar ground cover. More specifically, mowing machine 2 is particularly suited for mowing relatively large areas of grass which may cover many acres of land. Golf courses, cemeteries, and parks are typical examples of the types of areas meant to be mowed by mowing machine 2. Mowing machine 2 is designed to carry an operator who selectively drives and manipulates the mowing machine to cut the grass. Mowing machine 2 as described herein is known as the Turf Pro 84$^{TM}$ Traction Unit manufactured by the Toro Company of Minneapolis, Minnesota. Mowing machine 2 will be described herein insofar as is necessary to a background for and an understanding of the present invention which relates generally to a self-compensating brake system.

Mowing machine 2 comprises a body or frame 4 which is movably supported by three rotatably mounted drive or traction wheels 5, 6, and 7. Two of the drive wheels, i.e. drive wheels 5 and 6, are mounted adjacent the front of body 4 and are placed on opposite sides of body 4 in an opposed relationship. The third drive wheel 7 is placed at the rear of the body 4 and is disposed in a generally triangular relationship to the front drive wheels 5 and 6. Although this triangular wheel arrangement is preferred, other wheel arrangements, including a rectangular orientation of four drive wheels, could be used.

Figure 2:
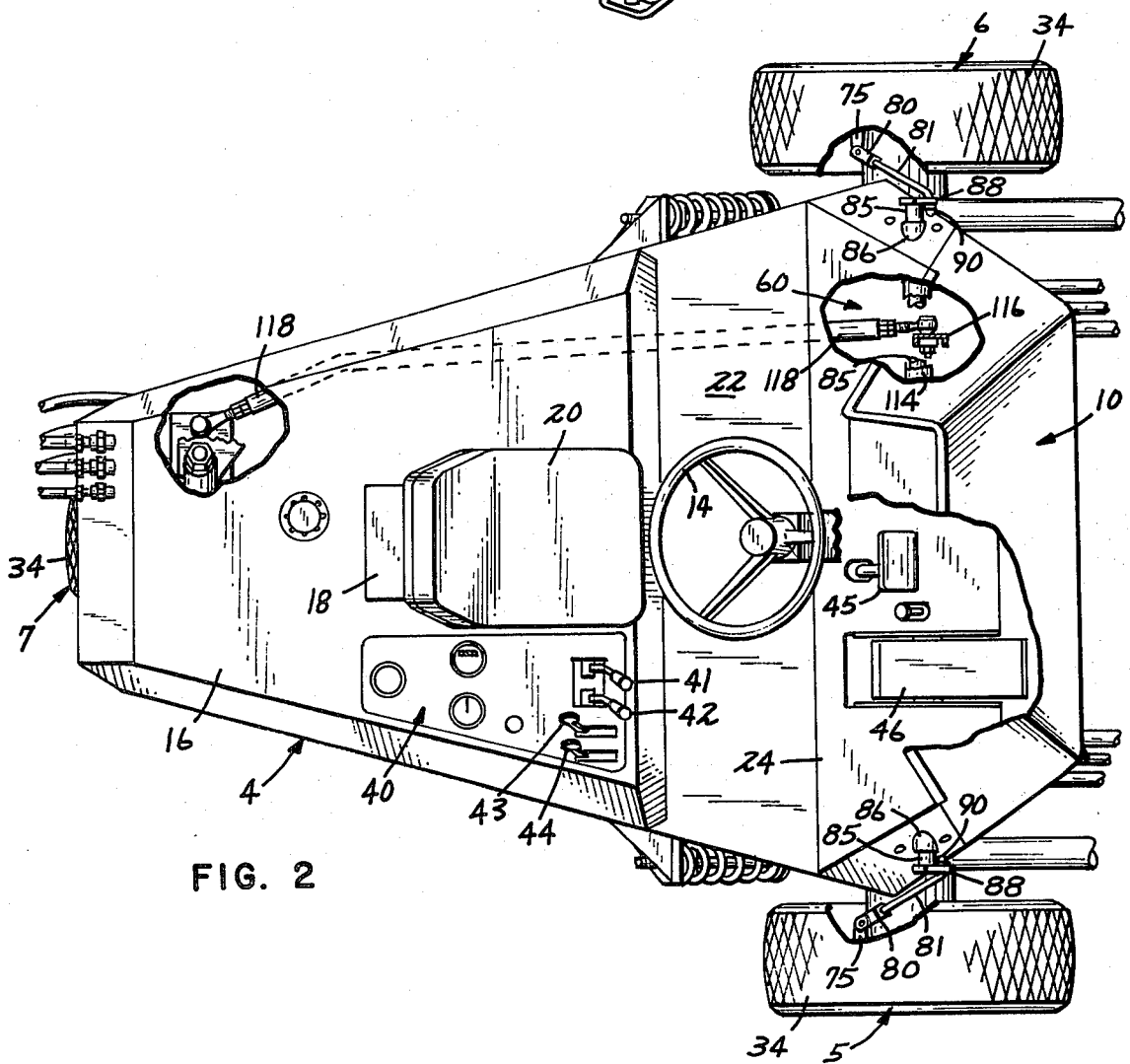
FIG. 2 is a top plan view of the grass mowing machine shown in FIG. 1, with various portions of the body thereof being broken away to illustrate portions of the brake shaft assembly of the present invention.

As shown in FIGS. 1 and 2, the body 4 of moving machine 2 includes a front shroud 10 having an upwardly extending steering column or tower 12. Steering tower 12 mounts a rotatable steering wheel 14 at its upper end. Steering wheel 14 is located at a position which is generally convenient for selective operation by the operator of mowing machine 2. Body 4 also includes a rear body portion 16 having a pylon or bracket member 18 on its upper surface. Pylon 18 mounts a seat 20 on which the operator sits while driving mowing machine 2. Rear body portion 16 is separated from the front shroud 10 to define a space into which the operator's legs extend as he sits on seat 20. However, rear body portion 16 is connected to front shroud 10 by a floor plate 22 having a slanted front panel 24 attached to the sides of front shroud 10.

Mowing machine 2 carries or mounts a plurality of grass cutting or mowing units. In particular, three cutting units 25, 26, and 27, are mounted on the body 4 of machine 2. Cutting unit 25 is mounted to the underside of body 4 generally underneath the front shroud 10 and floor plate 22. Cutting units 26 and 27 extend outwardly in front of the opposed drive wheels 5 and 6 of body 4 in a cantilever manner as shown in FIG. 1. Cutting units 25-27 are transversely oriented and overlap one another to give a width of cut which is larger than the width of body 4. In this regard, each of the cutting units 25-27 includes a rotatable cutting element comprising reel type rotatable blades 28. Reel blades 28 cooperate with a fixed bedknife (not shown) on each of the cutting units for cutting grass by the coaction between the reel blades 28 and the bedknife as the reel blades are rotated. The number of cutting units used on mowing machine 2 and the specific type of rotatable cutting element used is not critical to the present invention. Thus, fewer than three cutting units could be used and other generally conventional types of cutting devices could be substituted for reel blades 28.

A hydraulic motor 30 is operatively connected by any suitable transmission means (e.g., a chain and sprocket drive) to the reel blades 28 for rotating the same in either a forward or a reverse direction. Rotation of the reel blades 28 in a forward direction cuts the grass while rotation of the blades in a reverse direction is useful for what is known as a backlapping operation. A blacklapping operation is one in which the reel blades 28 and bedknife edges are coated with a good medium grade commercial lapping compound in a water soluble carrier. Upon completion of backlapping operation, the lapping compound can be easily washed away. Such a backlapping operation ensures that the cutting edges are sharp, even and consistent on all of the reel blades 28. In addition, each of the cutting units 25-27 is adapted to be hydraulically raised and lowered out of and into engagement with the ground. When the cutting units 25-27 are in their raised position, mowing machine 2 may be transported from one location to another (e.g., from a storage location to a mowing location). When the cutting units 25-27 are in their lowered positions in engagement with the ground, mowing machine 2 can be driven in a mowing operation.

A hydraulic motor 32 is provided for rotating each of the drive wheels 5-7 either in a forward or reverse direction. Referring to FIG. 4, each drive wheel 5-7 comprises a rubber tire 34 mounted on a rim 36. Rim 36 is releasably attached by conventional lug nuts to a hub 37. Hub 37 is in turn nonrotatably received in a rotatable output shaft 33 of hydraulic motor 32. Although hydraulic motors, such as the motors 30 and 32, are preferred for operating the drive wheels 5-7 and cutting units 25-27 because of low maintenance and high reliability, the specific drive mechanisms are not critical to this invention. Thus, the drive wheels 5-7 and cutting units 25-27 could be operated directly from the power shaft of the internal combustion engine (not shown) of mowing machine 2 through various conventional power transmission members (e.g., drive belts).

An instrument control panel 40 is mounted on body 4 adjacent to the operator's seat 20. Control panel 40 includes a cutting unit lift control 41 for raising and lowering the cutting units 25-27, a mow-backlap control 42 for rotating the cutting units 25-27 in either a mowing or backlapping direction, a choke control 43, and throttle control 44. Throttle control 44 governs the speed of the internal combustion engine (not shown) contained in body 4 which is used as the basic power source for mowing machine 2. Preferably, this engine comprises a twin-cylinder, air-cooled, four-cycle gasoline engine which develops 23 H.P. at 3600 r.p.m. This engine is used to power the hydraulic system of machine 2 and the various hydraulic pumps which then operate the hydraulic motors connected to the traction wheels 5-7 and the cutting units 25-27. In addition, the slanted front panel 24 of floor plate 22 mounts a plurality of foot controls which the operator also uses in driving and controlling mowing machine 2. These controls include a brake pedal 45 and a traction pedal 46. Traction pedal 46 will govern the speed at which mowing machine 2 is driven in conjunction with the engine speed determined by the setting of throttle control 44. Further details of mowing machine 2 and the various components thereof are not necessary to an understanding of the present invention.

The present invention relates primarily to a self-compensating brake system for the front drive wheels 5 and 6 of mowing machine 2. The brake system according to the present invention will be generally referred to as 60. In addition, brake system 60 also provides a convenient support and mounting member or structure for traction pedal 46 and for a steering transfer assembly generally indicated as 62.

Referring to FIG. 4 and 6, each of the drive wheels 5 and 6 include a generally conventional mechanically operated caliper type disc brake 64. Since the disc brakes 64 on the opposed drive wheels 5 and 6 are identical, description of one disc brake 64 will suffice to describe the other brake. Disc brake 64 comprises an annular brake or brake disc member 66 releasably attached to the hub 37 of the drive wheel 5 by a plurality of cap screws. Brake member 66 has an annular outwardly extending flange 67 received between a U-shaped secondary bracket 68. Secondary bracket 68 has two opposed side walls 69 and 70. A plurality of cap screws 71 pass through the upper portion of bracket 68 and through a fixed bracket 72 provided on the housing 31 of hydraulic motor 32. Cap screws 71 and secondary bracket 68 are slidably mounted relative to the fixed bracket 72. A spacer 73 and a lock nut 74 are provided on the outer end of each of the cap screws 71.

Both the fixed bracket 72 and the inner side wall 69 of secondary bracket 68 have a slot through which an actuating lever 75 extends. Lever 75 has a vertically extending pin 76 located adjacent its inner end 77. As shown in FIG. 6, pin 76 is fixedly located in a detent recess 78 formed on the inner surface of the side wall 69 of secondary bracket 68. Pin 76 serves as a pivot point or axis for actuating lever 75. The outer end of actuating lever 75 is connected by a clevice pin 79 to a U-shaped yoke 80 of a brake rod 81. The end of brake rod 81 adjustably receives yoke 80 by means of a threaded engagement. In addition, disc brake 64 comprises opposed stator assemblies 82 and 83 mounted between the side walls 69 and 70 of secondary bracket 68 around the shank of cap screws 71. Each of the stator assemblies 82 and 83 includes a pad of frictional braking material 84 which is adapted to bear against the annular flange 67 of brake member 66.

When actuating lever 75 is rotated about its pivot pin 76 by a force transmitted along brake rods 81, the inner end 77 of lever 75 cams the opposed stator assemblies 82 and 83 together to frictionally engage the pads 84 with the flange 67 of brake member 66. This brakes or stops the rotation of the drive wheel to which disc brake 64 is attached. In this regard, the braking force exerted on the drive wheel is proportional to the rotation of actuating lever 75 which is itself proportional to the force exerted on the lever 75 by the brake rod 81. To ensure equal braking of the opposed drive wheels 5 and 6 thereby preventing mowing machine 2 from veering or swerving as it is braked, equal forces should be exerted on the actuating levers 75 of the opposed drive wheels 5 and 6 by the brake rods 81.

Brake system 60 comprises a transverse cylindrical brake shaft 85 rotatably journaled in the sides of the front shroud 12 and generally beneath and forwardly of front panel 24 of floor plate 22 by means of suitable bearing assemblies 86. These bearing assemblies 86 allow brake shaft 85 to be freely slidable or "free-floating" along a transverse pivot axis 87 of brake shaft 85. Each end of the transverse brake shaft 85 has a longitudinally extending linkage ear 88 mounted thereon. An inturned end 90 of one brake rod 81 is eccentrically mounted in each linkage ear 88 relative to the transverse pivot axis 87 of the brake shaft 85. The remaining portion of each brake rod 80 between its inturned end 90 and the end of brake rod 81 connected to the corresponding actuating lever 75 extends at an oblique angle relative to the transverse pivot axis 87. In other words, brake rods 81 extend at an angle other then 90° with respect to pivot axis 87. This angle is obtuse (i.e., more than 90°) with respect to transverse axis 87 and acute (i.e., less than 90°) with respect to linkage ear 88. Any suitable angle other than 90° could be utilized in accomplishing the novel results of the present invention. The oblique angle formed with respect to the transverse axis 87 will be designated as $\alpha$ for one brake rod 81 and as $\beta$ for the other brake rod 81.

Brake pedal 45 is fixedly attached, as by welding, to brake shaft 85. A return spring 91 is connected between brake shaft 85 and the body 4 of mowing machine 2 to normally bias brake shaft 85 to a position where brake rods 81 do not actuate the disc brakes 64. When the brake pedal 45 is manually depressed by the foot of the operator of mowing machine 2, brake shaft 85 is rotated against the bias of return spring 91. This rotates each linkage ear 88 and imposes a brake actuating force 92 along each of the brake rods 81. The brake actuating force 92 along each of the brake rods 81 can be resolved into two perpendicular components 93 and 94. The first force component 93 is substantially at right angles to the transverse pivot axis 87 of the brake shaft 85. Thus, force component 93 tends to rotate the actuating lever 75 about the pivot pin 76 to actuate the disc brake assembly 64. However, the second force component 94 extends generally parallel to or along the axis of the brake shaft 85 because of the angular orientation of the brake rod 81 relative to the shaft 85.

Assuming that brake shaft 85 is initially centered with regard to the centerline of body 4 of mowing machine 2, the angles $\alpha$ and $\beta$ will be equal. In this event, when the total brake actuating force 97 on each of the brake rods 81 is unequal as the brake pedal is actuated, the force components 94 will also be unequal. Because brake shaft 85 is transversely free-floating in the body 4, the unequal force components 94 will transversely slide the brake shaft 85 along transverse axis 87. This causes angle $\alpha$ to increase and $\beta$ to decrease, or vice-versa, until the force components 94 equalize or balance against one another. When the force components 94 are equal, the total braking force 92 on each brake rod 81 will also be substantially equal ensuring uniform and equal actuation of disc brakes 64. Brake system 60 is thus automatically self-compensating to ensure that the braking action on each of the opposed drive wheels 5 and 6 is substantially equal. If the braking action is not equal when brake pedal 45 is initially activated, brake shaft 85 will slide transversely in one direction or the other until the braking forces become substantally equal.

The self-compensating brake system 60 of this invention is particularly advantageous since time-consuming adjustments of the brake rods 81 are no longer needed. When mowing machine 2 is initially being set up for a mowing operation, the brake rods 81 are threaded inwardly or outwardly relative to the yokes 80 to initially ensure that the braking forces on each of the drive wheels 5 and 6 will be roughly equal though they need not be exactly equal. If the braking forces are initially extremely unequal, brake shaft 85 might not be able to transversely slide far enough relative to the body 4 to equalize the braking forces. However, assuming that the braking forces on drive wheels 5 and 6 are initially roughly equal, then the brake system 60 according to the present invention will automatically ensure that the braking forces are equalized whenever brake pedal 45 is actuated. This obviates the prior art arrangement of having to periodically adjust the brake linkages in a trial and error adjusting operation to ensure equal braking action on the opposed drive wheels.

Another feature of the present invention is that brake shaft 85 also serves as the mounting shaft or support member for both traction pedal 46 and the steering transfer assembly 62. Traction pedal 46 is loosely and rotatably journaled about brake shaft 85 by a cylindrical sleeve 100 fixedly welded to the underside of traction pedal 45. Sleeve 100 is transversely confined on brake shaft 85 by opposed flanges 102 connected to front panel 24. Traction pedal 46 has a throttle linkage 103 which extends to the various drive mechanisms of drive wheels 5–7.

Steering transfer assembly 62 comprises an elongated steering shaft 104 having an externally threaded lower end 106. Steering shaft 104 is vertically oriented inside the steering tower 12 and mounts the steering wheel 14 on its upper end. The lower end 106 of steering shaft 104 is threadedly engaged with a steering follower 108 having outwardly projecting knobs 110 on either side thereof. Knobs 110 are received in steering follower arms 112 which are fixedly connected to and project forwardly from a steering transfer tube 114 such that steering follower 108 is located in front of steering transfer tube 144. Transfer tube 114, like sleeve 100, is rotatably journaled about brake shaft 85 and is confined between opposed flanges 115. In addition, transfer tube 114 has a flange 116 to which a steering linkage 118 is connected. Steering linkage 118 leads from the flange 116 back to the rear drive wheel 7 for pivoting the drive wheel about a pivot axis. Upper and lower sleeves 120 and 122 receive the upper and lower ends of steering follower 108 and are releasably coupled together by two springs 124 on the front and back sides of the sleeves. Sleeves 120 and 122 serve as dust shields for the steering follower 108 and define a chamber surrounding the steering follower 108 which may be filled with grease through a grease fitting 126 to lubricate the operation of steering follower 108. In the operation of steering transfer assembly 62, rotation of the steering wheel 14 causes the steering follower 108 to vertically move up and down the steering shaft 104 which is fixed against vertical movement by a plurality of bearings (not shown) in steering tower 12. This in turn pivots the forwardly projecting transfer arms 112 causing the attached transfer tube 114 to also rotate about the brake shaft 85 to thereby actuate steering linkage 118.

Thus, the brake system 60 of this invention also serves as a mounting and support structure, not only for the braking system per se, but for the traction pedal 46 and steering transfer assembly 62. This is an improvement over those prior art machines in which separate shafts were used to individually mount the braking system, the traction pedal, the steering transfer assembly and other similar components. Since only one shaft now mounts these components, savings of both material and space have been effected, thereby rendering mowing machine 2 less expensive to manufacture and/or purchase.

Various modifications of this invention will be apparent to those skilled in the art. For example, brake shaft 85 is free to slide transversely along axis 87 within certain limits (e.g., until a member fixed on brake shaft, such as brake pedal 45, abuts against a member fixed on body 4, such as one of the flanges 102 or 115). These limits must be selected to give brake shaft 85 sufficient transverse sliding movement to achieve equal braking of disc brakes 64 assuming the brakes 64 are initially adjusted such that their braking forces are roughly equal. Therefore, the scope of this invention is to be limited only by the appended claims.

What is claimed is:

1. A self-compensating brake system for a drive vehicle having a body which rotatably carries a least two opposed drive wheels, which comprises:
   (a) a brake shaft rotatably journaled in the body and being slidably mounted for movement relative to the body along a transverse axis of the brake shaft;
   (b) a brake assembly carried on each opposed drive wheel, each brake assembly including an actuating lever which operates the brake assembly in an amount equal to an activating force applied to the actuating lever; and
   (c) two opposed brake rods operatively connecting opposite ends of the brake shaft to one of the actuating levers, each brake rod extending between the brake shaft and the corresponding actuating lever at an oblique angle relative to the transverse axis such that rotation of the brake shaft applies a force along the brake rod having at least a first component along the transverse axis, whereby the brake shaft will be moved transversely until the first components of force along the transverse axis provided by the opposed brake rods are substantially equal to achieve equal braking of the drive wheels.

2. A self-propelled mowing machine suitable for cutting a ground covering, which comprises:
    (a) a body;
    (b) at least three drive wheels rotatably carried on the body, at least two of the drive wheels being arranged opposite to one another on the body;
    (c) motor means for rotating each of the drive wheels in at least a forward direction;
    (d) a least one cutting unit mounted on the body for vertical movement into and out of engagement with a ground covering which is to be moved, the cutting unit comprising a rotatable cutting element;
    (e) powered means for vertically moving the cutting units and for rotating the cutting element thereof at least in a cutting direction;
    (f) a brake assembly associated with each of the two opposed drive wheels for braking the rotation of the drive wheels; and
    (g) a transversely free-floating brake shaft rotatably journaled in the body for rotation about a longitudinal axis extending through the shaft, the brake shaft being operatively connected at either end by a brake rod to each of the brake assemblies on the two opposed drive wheels, the brake rods being configured such that rotation of the brake shaft both actuates the brake assemblies and causes the brake shaft to slide transversely in the body until the braking forces on each of the opposed drive wheels are substantially equal.

3. A self-propelled mowing machine as recited in claim 2, wherein each of the brake rods form an oblique angle relative to a transvere axis of the brake shaft.

4. A self-propelled mowing machine as recited in claim 2, wherein a third drive wheel is disposed relative to the two opposed drive wheels in a generally triangular relationship, the third drive wheel being steerable and being operatively connected to a steering mechanism on the body.

5. A self-propelled mowing machine as recited in claim 2, wherein each end of the brake shaft has a longitudinally extending linkage ear, and wherein such brake rod has opposed first and second ends, the first end of each brake rod being inturned relative to the brake rod and being eccentrically connected to one of the linkage ears relative to a transverse axis of the brake shaft, the second end of each brake rod being connected to the corresponding brake assembly such that the brake rod forms an oblique angle relative to the transverse axis of the brake shaft.

6. An improved self-propelled grass mowing machine of the type having a body supported by a plurality of drive wheels; a steering mechanism operatively connected by a steering transfer assembly to at least one of the drive wheels for steering the body; a brake system operatively connected to at least two opposed drive wheels for braking the rotation of the drive wheels, the brake system including a brake peddle rigidly attached to an elongated brake shaft rotatably carried in the body; motor means for powering the drive wheels to move the body at least in a forward direction; a traction peddle connected to the motor means for selectively controlling the operation of the motor means to control the speed of movement of the body; and at least one cutting unit operatively connected to the body and suited for engaging the ground to mow grass thereon; wherein the improvement comprises rotatably journaling both the traction peddle and the steering transfer assembly about the brake shaft.

7. An improved self-propelled grass mowing machine as recited in claim 6, in which the steering transfer assembly comprises:
    (a) an elongated steering shaft having one end threadedly engaged with a steering follower and the other end connected to a steering wheel;
    (b) two opposed steering follower arms connected to the steering follower at one end and to a steering transfer tube at the other end; and
    (c) the steering transfer tube being rotatably journaled about the brake shaft and being connected by a steering linkage to the steerable drive wheel, whereby rotation of the steering wheel and steering shaft causes the steering follower to move up and down the steering shaft and rotate the steering transfer tube about the brake shaft to effect movement of the steerable drive wheel.

* * * * *